United States Patent

Weitzsch et al.

[15] 3,688,019

[45] Aug. 29, 1972

[54] DEMODULATOR CIRCUIT FOR COLOR TELEVISION-RECEIVER

[72] Inventors: Fritz Weitzsch; Erich Eduard Walther, both of Hamburg, Germany

[73] Assignee: U.S. Philips Corporation, New York, N.Y.

[22] Filed: Jan. 23, 1970

[21] Appl. No.: 5,207

[30] Foreign Application Priority Data

Dec. 18, 1969 Germany..........P 19 63 464.1

[52] U.S. Cl.........178/5.4 SY, 178/5.4 HE, 178/5.4 P

[51] Int. Cl...............................................H04n 9/46

[58] Field of Search..........178/5.4 P, 5.4 SY, 5.4 SD, 178/69.5 CB; 329/50

[56] References Cited

UNITED STATES PATENTS

| | | | |
|---|---|---|---|
| 3,504,110 | 3/1970 | Wagner | 178/5.4 HE |
| 2,848,537 | 8/1958 | Richman | 178/5.4 SY |
| 3,133,149 | 5/1964 | Inaba | 178/5.4 SY |
| 3,315,028 | 4/1967 | Kool | 178/5.4 SY |
| 3,342,930 | 9/1967 | Kool | 178/5.4 SY |

OTHER PUBLICATIONS

Patchett, Color Television, 1968, Norman Price Publishers, p. 145.

*Primary Examiner*—Robert L. Griffin
*Assistant Examiner*—John C. Martin
*Attorney*—Frank R. Trifari

[57] ABSTRACT

A phase control circuit for a demodulator circuit for a PAL receiver, wherein with the aid of the output signals of two synchronous demodulators each of which signals of two synchronous demodulators each of which demodulate a quadrature component from the PAL chrominance signal a phase correction signal dependent on the differential phase error is obtained after filtering and multiplication, division or similar non-linear handling for the purpose of correcting the phase of the axes of the PAL chrominance signal to be demodulated relative to that of the chrominance sub-carrier signal to be used for the synchronous demodulation.

12 Claims, 4 Drawing Figures

Figure 4:
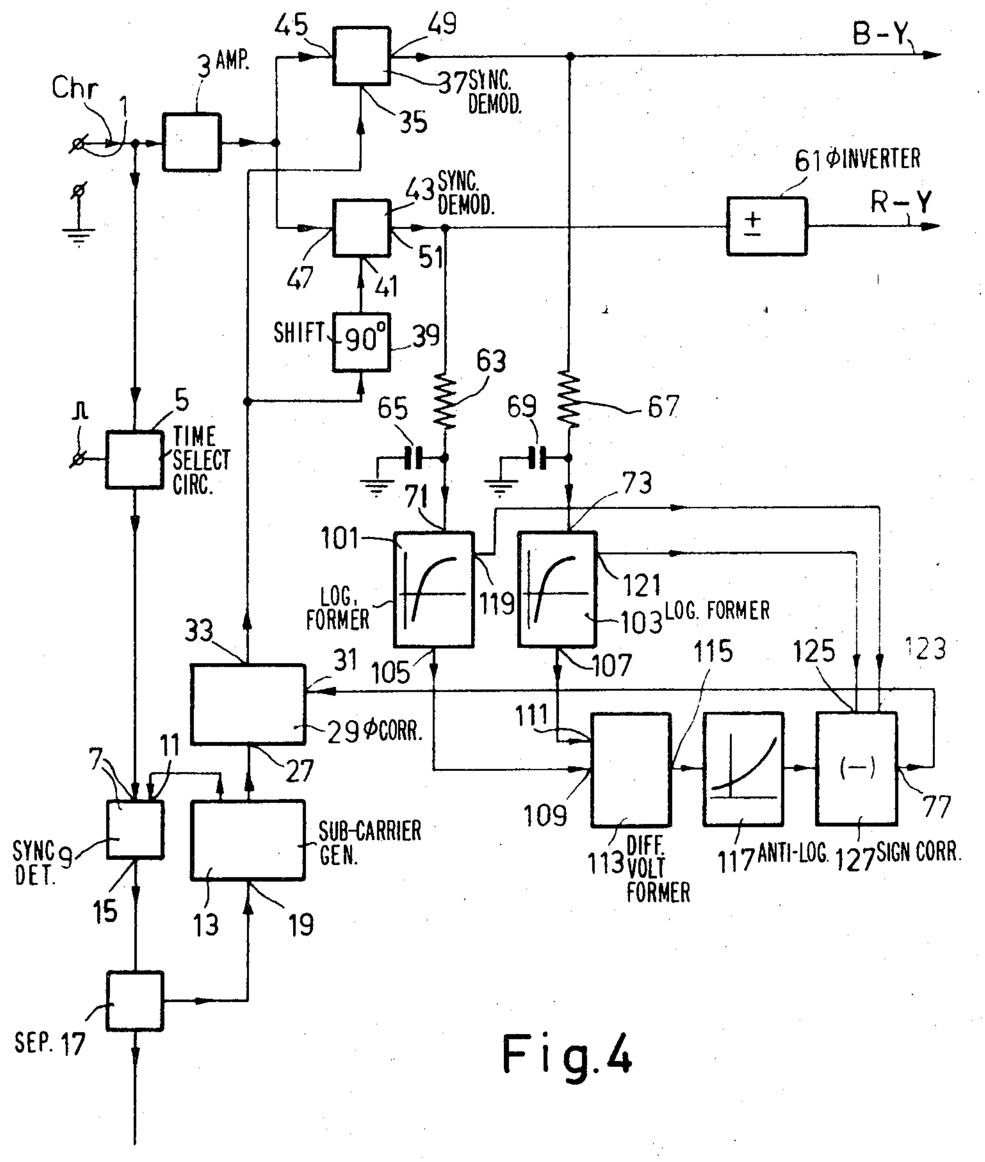

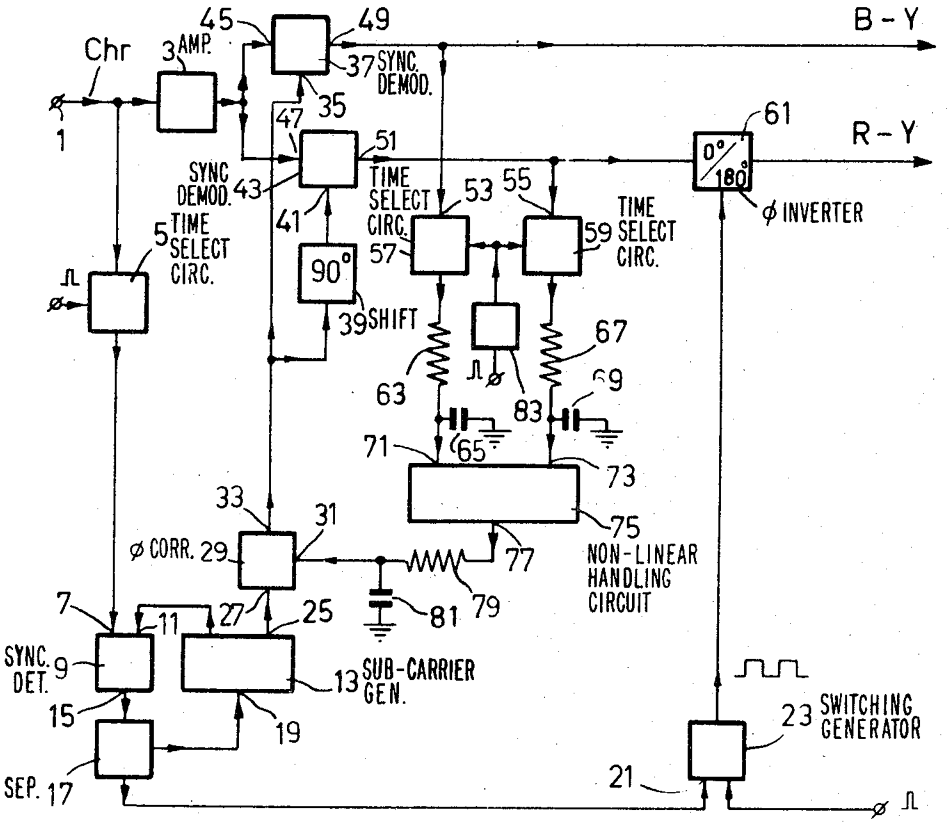
Fig.1
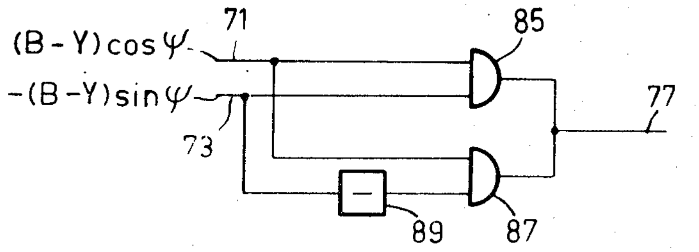
Fig.2
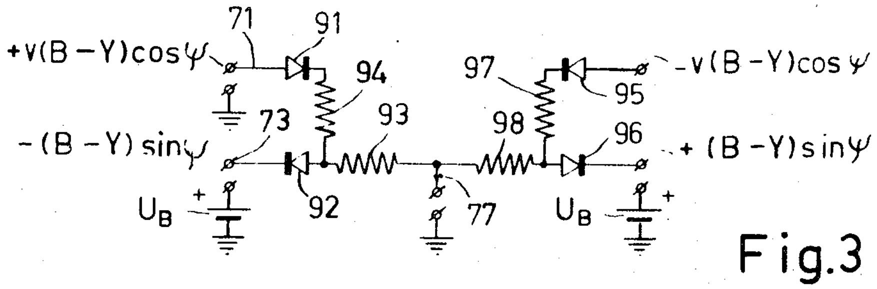
INVENTORS
FRITZ WEITZSCH
ERICH E. WALTHER
BY
[signature]
AGENT

INVENTORS
FRITZ WEITZSCH
ERICH E. WALTHER
BY
AGENT

DEMODULATOR CIRCUIT FOR COLOR TELEVISION-RECEIVER

The invention relates to a demodulator circuit for demodulating a chrominance signal of a PAL color television system which chrominance signal comprises a first quadrature component of a chrominance subcarrier of substantially constant phase, which component is modulated by a first color difference signal, and a second quadrature component of said chrominance subcarrier differing 90° from the first component and alternating 180° in phase from line to line and being modulated by a second color difference signal which demodulator circuit includes a chrominance subcarrier regeneration circuit which is coupled to a first and to a second color difference signal demodulator which color difference signal demodulators are furthermore coupled to a chrominance signal input of the demodulator circuit.

Such a demodulator circuit is known from German Pat. specification No. 928,474 which describes the principles of the PAL system. In this system the chrominance subcarrier regeneration circuit regenerates a chrominance subcarrier which has a given phase relation to the reference signal (burst) in the chrominance signal. When a differential phase error occurs in the chrominance signal, that is to say, a deviation from the desired phase relation between the reference signal and the color information in the chrominance signal, color errors which are opposed from line to line occur upon display in a receiver as described in the said patent specification which, although visually averaged, still result not only in a reduced color saturation, but also in a clearly visible line structure (Hannover bars, Venetian blinds) in the picture. In a demodulator circuit which was developed at a later stage, these errors were averaged with the aid of a delay line and as a result of a differential phase error an even color saturation error which is much less disturbing occurs.

An object of the present invention is to greatly reduce the influence of a differential phase error and the chrominance signal on the demodulator circuit.

To this end, a demodulator circuit of the kind described in the preamble according to the invention is characterized in that an output of each demodulator circuit is coupled at least through a filter circuit to an input of a non-linear signal handling circuit while an equal number of phase switching circuits producing an alternating phase shift being 0° or 180° from line to line in the signals at the inputs of the non-linear handling circuit is coupled to each of the signal paths from the chrominance signal input to the inputs of the non-linear signal handling circuit, and that an output of the non-linear signal handling circuit is coupled to a phase control signal input of a phase correction circuit influencing the phase relation between the signals at each demodulator.

The Applicant has found that when a differential phase error occurs during demodulation of the color information signal in the chrominance signal, components are present in the demodulated signal, when demodulated in the manner as described by the characteristic of the invention, which components are a measure of the magnitude and direction of the differential phase error and thus may be used in the manner described for a differential phase error compensation.

In order that the invention may be readily carried into effect, a few embodiments thereof will now be described in detail by way of example, with reference to the accompanying diagrammatic drawing, in which:

FIG. 1 shows by way of a block diagram a demodulator circuit employing a differential phase error correction according to the invention and a non-linear handling circuit formed as a multiplier circuit, FIG. 2 shows by way of a block diagram a non-linear handling circuit including gating circuits for a demodulator circuit according to the invention, FIG. 3 shows by way of a circuit diagram an embodiment of the circuit according to FIG. 2, wherein diode gating circuits are used, FIG. 4 shows by way of a block diagram a demodulator circuit according to the invention wherein a quotient forming circuit is used as a non-linear handling circuit.

In FIG. 1 a PAL chrominance Signal Chr is applied to an input 1 of a chrominance signal amplifier 3. This signal Chr is also applied to an input of a time selection circuit 5 which conducts during the occurrence of a chrominance subcarrier sampling signal (burst), hereinafter referred to as burst signal, in the chrominance signal and which passes on this burst signal to an input 7 of a synchronous detector 9. A reference signal provided by a chrominance subcarrier generator 13 is applied to a reference signal input 11 of the synchronous detector 9. These applied signals cause a voltage at an output 15 of the synchronous detector 9 which voltage has a DC component and also an AC component of half the line frequency in the currently common PAL system having a burst alternating in phase from line to line. These components are separated by a separator circuit 17 and applied to a control signal input 19 of the generator 13 and to an identification signal input 21 of a switching signal generator 23 operated by a line flyback pulse.

The chrominance subcarrier generator 13 applies a chrominance subcarrier signal to an output 25 which signal is coupled in frequency and phase to the component of the non-alternating phase of the burst signal with the aid of the given control loop after the synchronous detector 9 and the separator circuit 17 to the control signal input 19.

This chrominance subcarrier signal is applied from the output 25 to an input 27 of a phase correction circuit 29. The phase correction circuit 29 has a control signal input 31 and passes on the chrominance subcarrier signal applied to its input 27 to an output 33 having a phase which is dependent on the control signal value at the control signal input 31.

The control signal at the control signal input 31 of the phase correction circuit 29 is obtained with the aid of a circuit arrangement according to the invention from the chrominance signal and provides a phase correction which corrects the mean differential phase error. This will be referred to hereinafter.

The chrominance subcarrier signal is applied from the output 33 of the phase correction circuit 29 to an input 35 of a first synchronous demodulator 37 and through a 90° phase-shifting network 39 to an input 41 of a second synchronous demodulator 43.

Inputs 45 and 47 of the synchronous demodulators 37 and 43, respectively receive the chrominance signal from the chrominance signal amplifier 3 and provide at their outputs 49 and 51, respectively, synchronously demodulated signals which are applied to inputs 53 and 55 of a first and a second time selection circuit 57 and 59, respectively.

The synchronously demodulated signals at the outputs 49 and 51 of the synchronous demodulators 37 and 43 have the following shape:

$$(B-Y)\cos\psi \pm (R-Y)\sin\psi \qquad (1)$$

and respectively $$\pm(R-Y)\cos\psi-(B-Y)\sin\psi \qquad (2)$$

wherein (B—Y) = the amplitude of the component of constant phase from the PAL chrominance signal (R—Y) = the amplitude of the component having a phase alternating 180° from like to line from the PAL chrominance signal $\psi$ = the differential phase error indicating the phase difference between the chrominance subcarrier signals at the inputs 35 and 41 of the synchronous demodulators 37 and 43, respectively which subcarrier signals are coupled in phase to the burst signal and the phase of the quadrature component axes in the signals at the inputs 45 and 47, $\pm$ = the alternation of sign which occurs from line to line as a result of the 180° phase alternation from line to line.

The demodulated signals according to formulas (1) and (2) may be used in a PAL simple receiver, that is to say, a receiver in which before demodulation no splitting of the quadrature components with the aid of a delay line takes place, for obtaining the color information for the picture display and are therefore applied to outputs denoted by (B—Y) and (R—Y). The signal originating from the output 51 must then first pass a phase inverter circuit 61 which shifts the phase of the signal 0° or 180° from line to line. Phase inverter circuit 61 is operated by a half-line frequency switching voltage originating from the switching signal generator 23.

The signals according to formulas (1) and (2) at the outputs 49 and 51 of the synchronous demodulators 37 and 43 each include a component having an equal sign and a component having a sign alternating from line to line. Furthermore each signal includes a sin $\psi$ component which is substantially proportional to the differential phase error for errors which are not too great. However, the polarities of the said components depend on the polarity of the color difference signal itself. To eliminate this influence of the polarity of the color difference signals, the signals are filtered and applied to a non-linear handling circuit according to the invention:

In principle it is possible to filter the components of the alternating sign from each of the signals (1) and (2) with the aid of filters tuned to half the line frequency. After a non-linear handling, a synchronous detection is then necessary because in that case only alternating voltage components are obtained which are not suitable for control purposes without further steps. It is simpler to filter the components of equal sign with the aid of lowpass filters, in this case formed by resistors 63 and 67 and capacitors 65 and 69, and to apply them to inputs 71 and 73 of a non-linear handling circuit 75.

The significance of the time selection circuits 57 and 59 will be referred to hereinafter. First it will be assumed that the output signals of the synchronous detectors 37 and 43 are applied to the inputs 71 and 73 of the non-linear handling circuit after filtering out the component of the alternating sign.

In the case shown the components (B—Y) cos $\psi$ and —(B—Y) Y) sin $\psi$ are applied to the inputs 71 and 73 of the non-linear handling circuit. The lowpass filters 63 and 65, 67 and 69 must have a time constant which amounts to a number of line periods of more than two.

If the non-linear handling circuit 75 is in principle a product-forming circuit, a signal occurs at an output 77 thereof which signal is the product of the components of equal sign of the formulas (1) and (2), hence $$-(B-Y)^2\sin\psi\cos\psi = -\text{one-half}\,(B-Y)^2\sin 2\psi \qquad (3)$$

Since in this formula the square value of the amplitude of the (B—Y) signal occurs, the polarity thereof has no influence any longer and a control voltage is obtained which is dependent on the differential phase error and is usable for control purposes.

The non-linear handling circuit may in principle alternatively be a quotient-forming circuit, a signal:

$$-tg\,\psi \qquad (4)$$

then appears at the output 77.

Even the amplitude of the color difference signal has disappeared from this signal, while the control range is not restricted to approximately 45° due to the absence of the double angle as in the product-forming circuit.

The control signal obtained at the output 77 of the non-linear handling circuit 75 is applied through a lowpass filter including a resistor 79 and a capacitor 81 to the control signal input 31 of the phase correction circuit 29 so that the mean differential phase error $\psi$ at the synchronous detectors 37 and 43 is controlled substantially to zero, and errors in the output signals of the synchronous demodulators which cause errors in the picture display are substantially avoided. In this way in a PAL simple receiver the so-called "Venetian blinds" or "Hannover bars", a disturbing line structure in the picture may greatly be reduced. If the system would be used in a receiver employing a delay line in a decoder circuit (PAL de Luxe) the saturation errors as a result of differential phase errors could be reduced. In such a receiver a decoder circuit employing synchronous demodulators for the signals to be displayed would have to be present in addition to the demodulation system for obtaining a phase correction signal.

The mean values of the signals at the inputs 71 and 73 may be zero as a result of polarity changes in the filtered color difference signal component (B—Y) as, for example, may be the case when receiving a test signal. Therefore the time selection circuits 57 and 59 are provided which ensure that the mean value of the signal is determined not over an entire line period but only over a portion thereof, at least a picture color element period (1/usec), for example, 5 to 20 percent of the line period. The time selection circuits 57 and 59 are rendered conducting only during a portion of the line period as a result of a pulse derived from a line flyback pulse and delayed by a delay circuit 83. The delay circuit may have, for example, a delay which is controllable by a sine or sawtooth generator the frequency of which is preferably taken to below preferably in the vicinity of 0.5 to 15 Hz or of 150 –1,000 Hz. It will be evident that these time selection circuits are an improvement which is not essential for the invention and may be omitted, if desired.

The control time constant must be sufficiently short to be able to compensate quick phase error changes. A favorable value of the time constant of the lowpass filter constituted by the resistor 79 of the capacitor 81 has been found to be larger than one picture period and, for example, larger than 10 to 100 m.sec.

If each of the output signals at the synchronous demodulators 37 and 43 is shifted 180° in phase from line to line through a phase-switching circuit for which only a further phase switch is required after the output 49 of the first synchronous demodulator 37, because a phase switch 60 is present after the other synchronous demodulator 43, then a control signal $$\frac{1}{2} (R-Y)^2 \sin 2\psi \quad (5)$$

may be obtained with the aid of a filter and a multiplier circuit.

If the two control signals (3) and (5) are generated and used simultaneously, also a control signal is present when one of the color difference signals (R—Y) or (B—Y) is zero for a comparatively long period.

FIG. 2 shows a non-linear handling circuit by which also the polarity of the color difference signals may be rendered inactive.

The non-linear handling circuit has a gating circuit 85 which passes on the filtered signal $-(B-Y) \sin \psi$ to the input 73 when the filtered signal $(B-Y) \cos \psi$ at the input 71 is positive. Conversely, a gating circuit 87 which receives the input signal at the input 73 through an inverter stage 89, passes on the polarity reversed signal $(B-Y) \sin \psi$ when the signal at the input 71 $(B-Y) \cos \psi$ is negative. Thus a control signal $(B-Y) \sin \psi$ appears at the output 77 of this non-linear handling circuit.

The circuit of FIG. 2 may be formed, for example, as that shown in FIG. 3.

A signal $(B-Y) \cos \psi$ amplified by a factor of $v >> 1$ is applied to the anode of a diode 91 while the signal $-(B-Y) \sin \psi$ is applied to the cathode of a diode 92. A voltage source $U_B$ is incorporated in series with the voltage $-(B-Y) \sin \psi$ such that the diode 26 cannot become conducting due to the maximum negative value of $-(B-Y) \sin \psi$ if its anode voltage has approximately ground potential.

The cathode of the diode 91 and the anode of the diode 92 are connected by means of a resistor 94 of high value. In case of a positive signal value of the signal $v(B-Y) \cos \psi$ at the input 71, the diode 92 then becomes sufficiently conducting so that the signal $-(B-Y) \sin \psi$ is passed on independently of the value thereof to the anode of the diode 92 and subsequently through a resistor 93 to the output 77 of the non-linear handling circuit.

In a corresponding manner an amplified voltage $-v(B-Y) \cos \psi$ is applied to the anode of a diode 95 and a voltage $(B-Y) \sin \psi$ is applied to the cathode of a diode 96. Connected in series with the last-mentioned voltage is a bias $U_B$ which has the same function as that for the diode 92. The cathode of the diode 95 is connected again through a resistor 97 of a high value to the anode of the diode 96. In case of a conducting diode 95 and hence at negative values of $(B-Y) \cos \psi$ a voltage $(B-Y) \cos \psi$ is passed on through the diode 96 and a resistor 98 to the output 77 of the non-linear signal handling circuit.

FIG. 4 shows a quotient-forming circuit wherein a control signal is generated which as in formula (4) a control signal is generated which as in formula (4) in the description of FIG. 1 does not show substantially any amplitude variation and consequently a variation of the phase error angle cannot occur as a result of variations in the control signal as to some extent be the case when using a product-forming circuit.

Corresponding components of the circuit might have the same reference numerals as those in the previous FIGS. For the description of the operation reference is made thereto.

The inputs 71 and 73 of the non-linear handling circuit are in this case inputs of two circuits 101 and 103 having a logarithmic transfer characteristic for the absolute value of the input signal. Outputs 105 and 107 of these logarithm-forming circuits 101 and 103, respectively, are connected to inputs 109 and 111, respectively, of a difference voltage-forming circuit 113. The logarithm of the quotient of the absolute value of the voltages at the inputs 71 and 73 is obtained at an output of this circuit, and applied to a circuit 117 having an anti-logarithmic transfer characteristic. In the logarithm-forming circuits 101 and 103 the sign of the voltages at the inputs is furthermore determined and converted into a signal becoming available at the outputs 119 and 121 which signal is applied to inputs 123 and 125 of a sign correction circuit 127. The sign correction circuit 127 thus passes on an output signal unchanged from the anti-logarithmic circuit 117 to the output 77 of the non-linear handling circuit when the signals at the inputs 71 and 73 have the same sign and inverts the sign of the passed-on signal when those input signals have a different sign. A control signal which is proportional to $tg\psi$ is produced at the output 77.

Circuit arrangements for drawing logarithms of electrical magnitudes which may be used for forming a quotient are, for example, known from German Auslegeschrift Pat. No. 1,185,845 and from "Die Internationale Elektronische Rundschau" 1969 no. 2 pages 45—48 and no. 3 pages 74—76.

In the above-given embodiments an active oscillator having a phase control by means of the burst signal is described as a chrominance subcarrier generator. It will be evident that alternatively other chrominance subcarrier regeneration circuits such as, for example, a passive integrator excited by the burst may be used.

The point when the phase control is not essential to the invention. In the above embodiments takes place this point has been chosen to succeed the chrominance subcarrier generator. A different phase control, for example, on the regenerator itself or in the burst signal path is likewise possible.

Furthermore it is possible to have the complete phase control taken over by the circuit arrangement according to the invention when the regenerator is first brought to its correct phase by means of the burst.

Although in the above given examples the quadrature components of the PAL signal were assumed to be modulated by a red and a blue color difference signal, this is not essential to the invention either. A PAL signal modulated by, for example, an I signal or a Q signal can be handled equally well by a circuit arrangement according to the invention.

A phase inversion which in the above-mentioned embodiments was effected after the demodulators may alternatively be effected in one of the input signal paths of the synchronous demodulators in those cases wherein no unswitched signal need be obtained from said demodulator.

What is claimed is:

1. A demodulator circuit for demodulating The chrominance component of a color television signal of a PAL color television receiver, which chrominance signal comprises a first quadrature component of a chrominance subcarrier modulated by a first color information signal, and a second quadrature component of said subcarrier modulated by a second color information signal, said second quadrature component alternating 180° in phase between successive line periods of said color television signal, said color signal further comprising a chrominance signal reference frequency component, said demodulator circuit comprising first and second synchronous demodulator means for producing demodulated color information signals, means for applying said first and second color information signals to said demodulators as respective first signal inputs, means responsive to said reference frequency component for producing first and second demodulating signals in phase quadrature and for applying said signals as respective second signal inputs to said demodulators, non-linear signal processing means comprising a filter circuit coupled to the outputs of said demodulators for receiving said color information signals and for producing a control quantity having a value determined by the phase difference between the respective first and second signals applied to said demodulators irrespective of said phase alterations, and means responsive to said control quantity for modifying the phase relationship between the chrominance signal respectively the demodulation signals applied to said demodulators.

2. A demodulator circuit as claimed in claim 1, further comprising means for reversing the phase of the output signal of one of said demodulators at a rate equal to one-half of the frequency of the line scanning frequency of said color television signal.

3. A demodulator circuit as claimed in claim 2, characterized in that the non-linear signal processing circuit is a multiplier circuit.

4. A demodulator circuit as claimed in claim 2, further comprising a lowpass filter interposed between said non-linear signal processing circuit and said phase modifying means.

5. A demodulator circuit as claimed in claim 4, characterized in that the cut-off frequency of the low-pass filter between the non-linear signal processing circuit and the phase modifying means is between 1 Hz and 100 Hz.

6. A demodulator circuit as claimed in claim 3 wherein the said multiplier circuit comprises a first and second gating circuit each having two inputs and an output, the two inputs of each gating circuit being coupled to the outputs of the demodulators, one input in phase with the corresponding input of the other gating circuit and the other input in opposite phase with the corresponding input of the other gating circuit.

7. A demodulator circuit as claimed in claim 2, characterized in that the non-linear handling circuit is a quotient-forming circuit.

8. A demodulator circuit as claimed in claim 7, wherein the said quotient-forming circuit comprises two logarithmic circuits an input of each of which is coupled to an input of the quotient-forming circuit and an output is coupled to an input of a difference-producing circuit, an output of which difference producing circuit is coupled at least through an anti-logarithmic circuit to the phase correction circuit, while a polarity correction circuit is coupled to the inputs of the logarithmic circuits and to the control signal input of the phase correction circuit.

9. A demodulator circuit as claimed in claim 1 wherein said phase relationship modifying means is interposed between said means for producing demodulating signals and said demodulators.

10. A demodulator circuit as claimed in claim 2 further comprising gating means interposed between the output of said demodulating means and said non-linear signal processing circuit, and means for energizing said gating means by a pulse signal of line frequency.

11. A demodulator circuit as claimed in claim 10 further comprising a delay circuit interposed between said gating means and the source of line frequency pulses.

12. A demodulator circuit as claimed in claim 11, characterized in that the delay circuit is coupled to a low-frequency signal generator, having a frequency in the range of 0.5 to 15 Hz for obtaining a periodically varying delay.

* * * * *